US005928713A

United States Patent [19]

Haaland et al.

[11] Patent Number: 5,928,713

[45] Date of Patent: Jul. 27, 1999

[54] METHOD FOR FABRICATING A GRADIENT REFRACTIVE INDEX OPTICAL FILTER

[75] Inventors: Peter D. Haaland, Dayton; Jeffrey J. Druessel, Bellbrook, both of Ohio

[73] Assignee: United States of America as represented by the Secretary of the Air Force, Wright-Patterson Air Force Base, Ohio

[21] Appl. No.: 08/624,842

[22] Filed: Mar. 19, 1996

Related U.S. Application Data

[63] Continuation-in-part of application No. 08/310,469, Sep. 22, 1994, abandoned.

[51] Int. Cl.[6] .................................................. B05D 5/06

[52] U.S. Cl. ........................... 427/10; 427/162; 427/166; 427/167; 427/255; 427/255.1; 427/255.2

[58] Field of Search ............................ 427/162, 10, 166, 427/167, 255.2, 255, 255.1

[56] References Cited

U.S. PATENT DOCUMENTS

| | | | |
|---|---|---|---|
| 4,837,044 | 6/1989 | Murarka et al. | 427/162 |
| 5,009,485 | 4/1991 | Hall | 427/162 |
| 5,102,213 | 4/1992 | Lee et al. . | |
| 5,121,239 | 6/1992 | Post | 359/95 |
| 5,181,143 | 1/1993 | Southwell | 427/162 |
| 5,182,788 | 1/1993 | Tanaka . | |
| 5,225,930 | 7/1993 | Land et al. . | |
| 5,238,738 | 8/1993 | Miller | 427/162 |
| 5,270,854 | 12/1993 | Lee et al. . | |
| 5,271,872 | 12/1993 | Sallavanti et al. . | |
| 5,340,607 | 8/1994 | Friz et al. | 427/162 |

OTHER PUBLICATIONS

*"Derivation of a Matrix Describing a Rugate Dielectric Thin Film",* B.G. Bovard, App Opt 27(10):1998 (May 15, 1988).

*"Fourier Transform Technique Applied to Quarterwave Optical Coatings",* B.G. Bovard, App Opt 27(15):3062 (Aug. 1, 1988).

*"Rugate Filter Deisgn: The Modified Fourier Transform Technique",* B.G. Bovard, App Opt 29(1):24 (Jan. 1, 1990).

*"Rugate Filter Theory: An Overview",* B.G. Bovard, App Opt 32(28):5427 (Oct. 1, 1993).

*"Optimal Phase Mudulation for Gradient–Index Optical Filters",* J. Druessel et al, Opt Lett 18(19):1583 (Oct. 1, 1993).

*Primary Examiner*—Janyce Bell

*Attorney, Agent, or Firm*—Bobby D. Scearce; Thomas L. Kundert

[57] ABSTRACT

A method for fabricating a gradient index optical filter comprising a thin film having a low refractive index contrast and a specific reflectance function structured using the phase of the refractive index profile as a variable to permit closed form, constrained optimization of rugate filters.

4 Claims, 5 Drawing Sheets

METHOD FOR FABRICATING A GRADIENT REFRACTIVE INDEX OPTICAL FILTER

This application is a continuation-in-part of application Ser. No. 08/310,469, filed on Sep. 22, 1994 now abandoned.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to thin film optical filters, and more particularly to a method for fabricating, in a single step, a gradient index optical filter having a specified reflectance function and constrained refractive index contrast.

Thin film optical filters find substantial application in filtering invasive laser light to prevent damage to biological and electrical sensors. The iterative structure of thin-film optical filters is described, for example in *Thin Film Optical Filters,* by H. A. Macleod (McGraw-Hill Publishing Co., New York (1989) the entire teachings of which are incorporated herein by reference.

Gradient index or rugate optical filters are continuous generalizations of the familiar quarterwave stack which find widespread applications in sensor hardening. In the design of a filter or mirror there are infinitely many refractive index profiles n(x) whose wavelength-dependent reflectance R(λ) is specified as a design objective. The relationship between R(λ) and the refractive index n(x) is nearly that of a Fourier transform pair. In accordance with a governing principle of the present invention, exploiting this relationship, specifically the physically indeterminate phase of the Fourier transforms, permits constrained optimization of rugate designs. Accordingly, the invention provides a novel method for fabricating a rugate type gradient index optical filter, structured as a thin film optical coating having a preselected reflectance as a function of wavelength, in which the refractive index is a continuous function of filter thickness. A filter fabricated according to the invention is therefore distinct from conventional quarter-wave filters in which alternate layers of materials define a discontinuous refractive index function through the thickness of the filter.

It is therefore a principal object of the invention to provide an improved optical filter.

It is a further object of the invention to provide a method for fabricating a thin film gradient index optical filter.

It is a further object of the invention to provide a gradient index optical filter with desired reflectance functions and constrained refractive index contrast in a single step.

It is a further object of the invention to provide a method for fabricating a thin filter having low refractive index contrasts.

It is yet a further object of the invention to provide a method for fabricating a thin film optical filter having a continuous sinusoidal refractive index function.

These and other objects of the invention will become apparent as a detailed description of representative embodiments proceeds.

SUMMARY OF THE INVENTION

In accordance with the foregoing principles and objects of the invention, a method for fabricating a gradient index optical filter comprising a thin film having a low refractive index contrast and a specific reflectance function structured using the phase of the refractive index profile as a variable to permit closed form, constrained optimization of rugate filters.

DESCRIPTION OF THE DRAWINGS

The invention will be more fully understood from the following detailed description of representative embodiments thereof read in conjunction with the accompanying drawings wherein:

FIG. 1*c* is the reflectance of p-polarized radiation for the rugate filter structure of FIG. 1*a* at an angle of 44.3 degrees;

FIG. 1*d*, considered in conjunction with EXAMPLE 1 presented hereinbelow, is a graph of the refractive index profile for a representative filter structured according to the teachings of the invention;

FIG. 1*e* is a plot of reflectivity versus wavelength for the filter of FIG. 1*d;*

DETAILED DESCRIPTION

A mathematical description of the computation of the optimal phase function Φ(k) in gradient index optical filters based on closed-form constraints imposed by filter thickness and maximum refractive index contrast in accordance with a governing principle of the invention is presented in Druessel et al, "Optimal Phase Modulation for Gradient Index Optical Filters", *Optics Letters* 18(19): 1583–5 (Oct. 1, 1993), the teachings of which and of the references cited therein are incorporated herein by reference.

Propagation of light through dielectric slabs with varying indices leads to optical transmission and reflection that vary with wavelength. Wavelength-selective filters are thus one class of optical limiter. The simplest example of this effect is seen in the quarterwave stack or notch filter. Application of Maxwell's equations to the design of optical filters and reflector is described, for example, by MacLeod, supra, and also by Furman and Tikhonravov (*Basics of Optics of Multilayer Systems,* Gif-sur-Yvette: Editions Frontieres, 1992, incorporated herein by reference). As suggested in Druessel et al, supra, Sossi identified a link between the reflectance spectrum of a multilayer structure, R(λ), and the Fourier transform of the refractive index gradient dn(x)/dx, as defined in Equations (1) and (2) of Druessel et al in terms of the wavenumber in air k=2π/λ, Q(k) as a simple function of R(λ), and x defined as twice the optical distance from the center of the inhomogeneous layer to the physical position z defined by Equation (3) of Druessel et al. In Sossi's Fourier based approach and further applications of it (see, e.g., Tikhonravov et al, *Appl Opt* 32, 4265 (1993); Verly et al *Appl Opt* 29, 3672 (1990); Fabricius, *Appl Opt* 31, 5191 (1992); and Bovard, *Appl Opt* 29 24 (1990), *Appl Opt* 27 1998 (1988); and 32, 5427 (1993), all incorporated by reference herein), the phase function Φ(k), has been set arbitrarily. The essence of the present invention is that the phase function Φ(k), which is imaginary, can be used as a free parameter for optimization of rugate designs. If physical constraint is on achievable index contrast, for example, the optimal phase function Φ(k) is defined by Equation (7) of Druessel et al. According to the method of the invention, then, given a desired reflectance spectrum R(λ), Q(k) is first computed, and the inverse Fourier transform is then applied with phase specified by Equation (7) of Druessel et al to get an optimal refractive index profile. The calculation of Φ(k) includes explicit constraints on the extreme values of n(x), resulting in an optical design which can be fabricated.

Figure 1A:
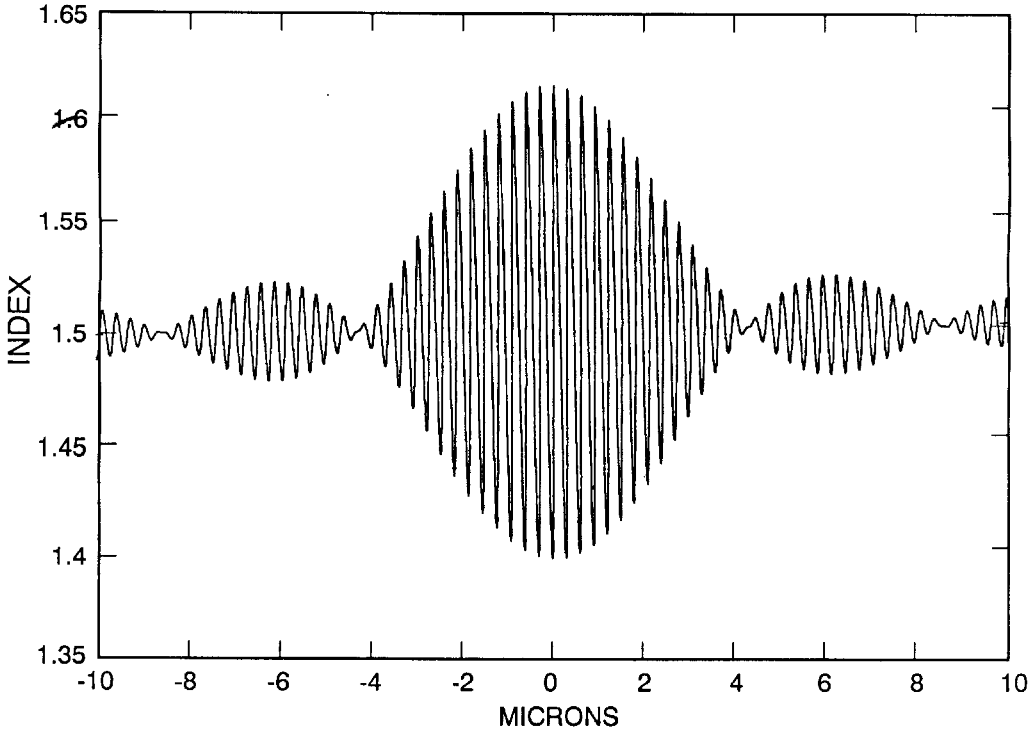
FIG. 1*a* is the refractive index profile computed according to the invention for a polarizing beamsplitter structure.

The practical consequences if this freedom in Φ(k) are profound, since the optical and mechanical properties of real materials constrain the index contrast which may be achieved in actual rugate filters. As an example of the method of the invention, consider a polarizing beamsplitter for adaptive optical compensation of atmospheric turbulence in telescopes. The beamsplitter behaves like a transmit-receive switch in radio engineering, its reflects high intensity, s-polarized radiation to excite sodium atoms in the mesosphere, but must transmit light with other wavelengths and polarizations back onto the telescope detectors. The beamsplitter must reflect s-polarized radiation to excite sodium atoms in the mesosphere, but must transmit light with other wavelengths and polarizations back onto the telescope detectors. The beamsplitter must reflect s-polarization radiation at 510, 578, and 589 nm with high efficiency while maximizing transmission of other wavelengths and polarizations. Consider further that the device comprises $SiO_2$: $TiO_2$ multilayers, so the physically achievable refractive index range falls between 1.55 and 1.85. The refractive index profile computed from the Fourier-based using optimal modulation to satisfy the index-contrast constraints is shown in FIG. 1*a*.

Figure 1B:
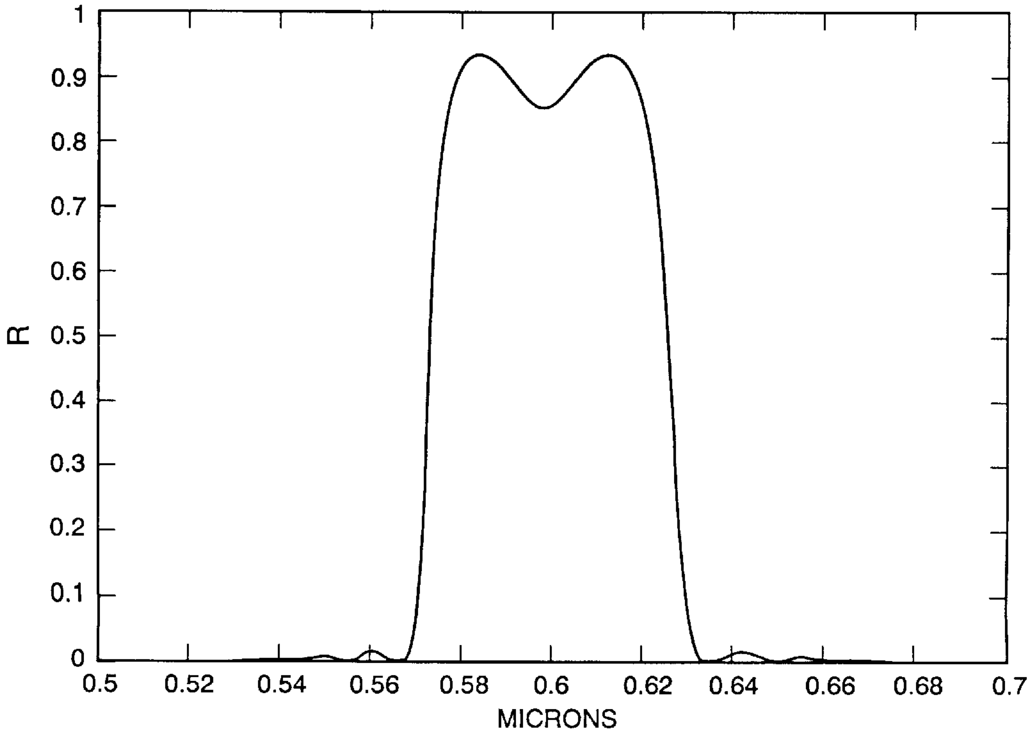
FIG. 1*b* is the reflectance of s-polarized radiation for the rugate filter structure of FIG. 1*a* at an angle of 44.3 degrees.

Reflectance properties of the gradient-index optical design are computed by standard matrix methods (see, e.g., MacLeod, supra) at an incident angle of 44.3 degrees. It is important to note that these reflectance calculations do not use the Fourier based logic that was used to compute the refractive index profile shown in FIG. 1*a*. A very high (99%) reflectance obtains for s-polarized radiation over each of the design bands as shown in FIG. 1*b*. Relatively broad reflectance bands, about 20 nm, were chosen to increase the fields-of-view for high reflectance and make the design less sensitive to optical misalignment. FIG. 1*c* shows the reflectance for p-polarized radiation, which is between 2 and 3% over the design range with the exception of oscillatory excursions in the bands where s-radiation is reflected. These values would be reduced somewhat by adding an antireflective coating not explicitly considered here as not being limiting of the invention.

The application of optimal phase modulation to structures of a 90% laser diode output mirror (from 590 to 610 nm) and a broadband, Ti: Sapphire laser reflector (from 700 to 1100 nm) are described in Druessel et al, supra. In each of these examples, the physically indeterminate phase function Φ(k) allows selection from the infinite set of Fourier transform pairs whose reflectance is desired, the profile n(x) which optimizes some other constraint imposed by the desired structure.

In the construction of a thin film optical filter according to the invention, the reflectance versus wavelength for the filter is first defined. The desired transmittance function Q(k) is selected according to Druessel et al, supra (see also Bovard, "Fourier transform technique applied to quarterwave optical coatings," *Appl. Opt.* 27, 3062–3, (1988); Bovard, "Rugate filter theory: an overview," *Appl. Opt.* 32(28): 5427 (1993)). The optimal phase function Φ(k) is calculated according to Druessel et al, and the refractive index is prescribed as a function of filter thickness. A filter according to the invention may be constructed using any suitable material having an index of refraction within the range of choice (viz about 1 to 4) as would occur to one skilled in the art guided by these teachings. Typical materials may include, but are not limited to, $SiO_2$, $CeF_3$, ZnS, polymer and ceramic. Typical substrate materials may include Si, $SiO_2$, GaAs, sapphire, $CaF_2$, or plastic. The materials may be deposited using vapor deposition techniques known to one skilled in the applicable art guided by these teachings.

Example 1

Consider a narrow band reflectance filter having a reflectivity of 90% between 580 and 620 nm and 0% reflectivity outside this band, the refractive indices of the substrate and incident medium are equal (n=1.5), and the total optical thickness of the filter is 20 μm of a material such as $Al_xGaAs_{1-x}$ or one selected from the group defined above. The appropriate Q(k) is selected and may be an empirical combination of two forms derived by Bovard ("Rugate filter design: the Modified Fourier transform technique," Appl. Opt. 29, 24–30 (1990); "Derivation of a matrix describing a rugate dielectric thin film," Appl. Opt. 27, 1998–2005, (1988)):

$$Q(k)=0.5(-\ln T)^{1/2}+0.5(1/T^{1/2}-T^{1/2})^{1/2}$$

where T is the optical transmittance function for the filter.

Substitution of Q(k) into the analysis presented by Druessel et al, supra, and the references cited therein, using Φ(k)=0 results in the refractive index profile shown in FIG. 1*d* which exhibits a reflectance spectrum as shown in FIG. 1*e*. The index of refraction ranges from just less than 1.4 to just greater than 1.6 (FIG. 1*d*) and the reflectivity is about 90% for the desired wavelengths (FIG. 1*e*).

Figure 2A:
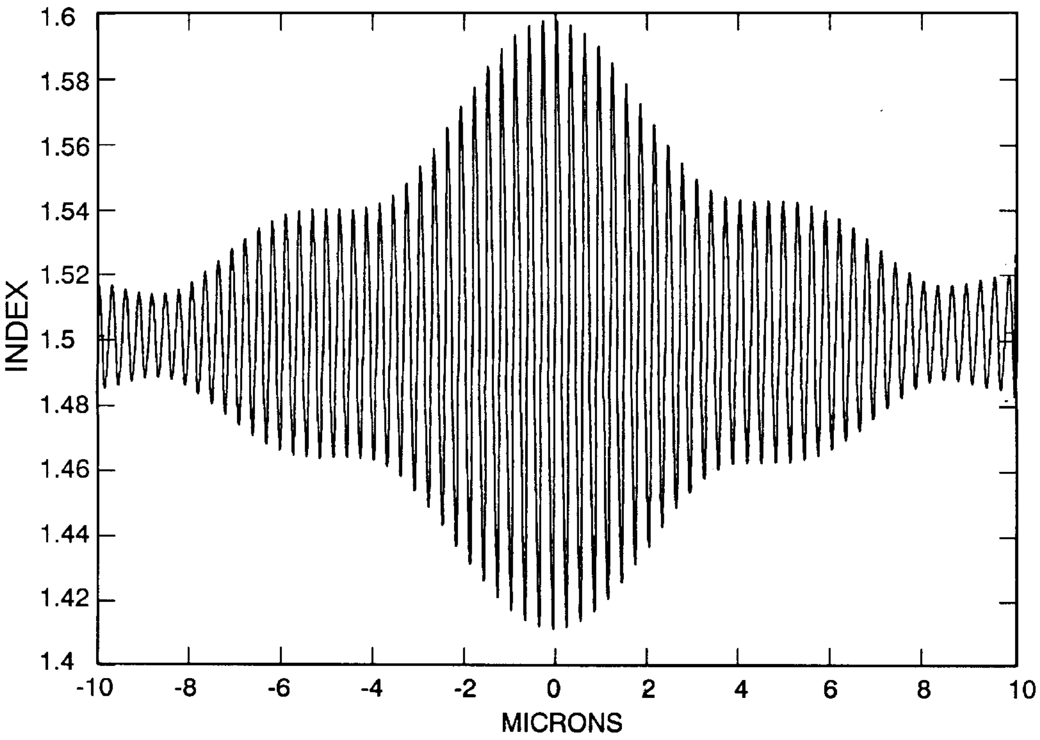
FIG. 2*a*, considered in conjunction with Example 1, shows the refractive index profile for the FIG. 1*d* filter when the phase function is optimized according to the method of the invention.
Figure 2B:
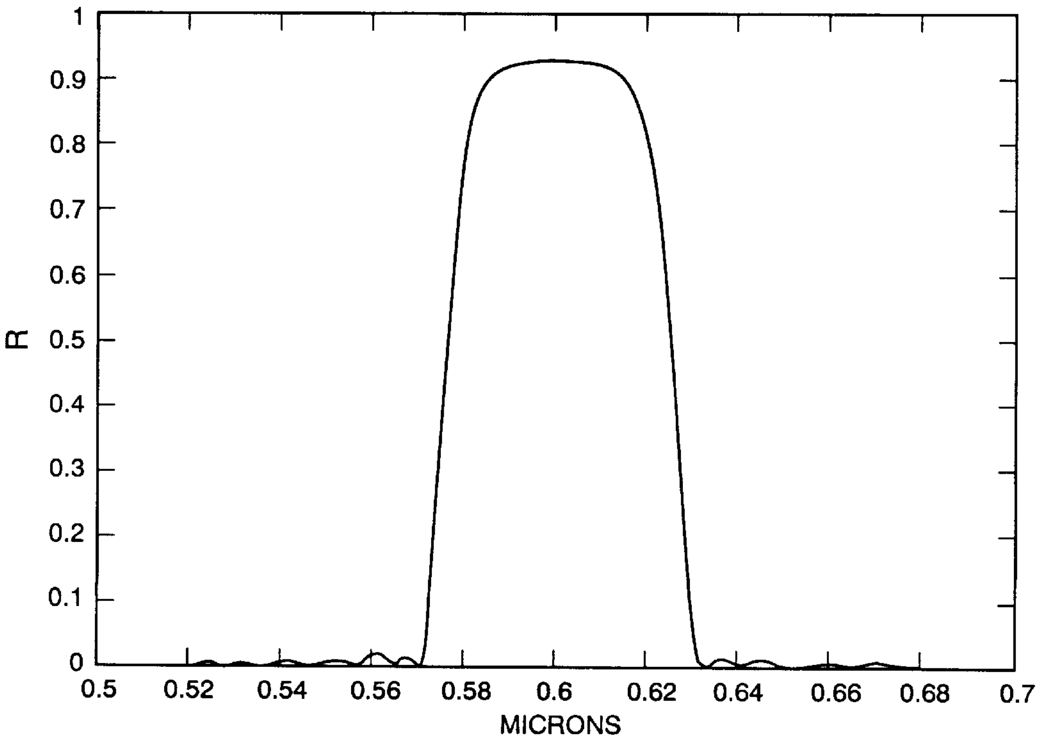
FIG. 2*b* is a plot of reflectivity versus wavelength for the phase function optimized filter structure of FIG. 2*a;*

The optimal phase function is then calculated according to Druessel et al, supra, for a filter of the same thickness (20 μm). FIG. 2*a* shows the refractive index profile for the optimized phase function and exhibits a refractive index range about 20% smaller than for Φ(k)=0 (FIG. 1*d*) and reflectivity closer to the desired 90% for the selected wavelengths.

Figure 3A:
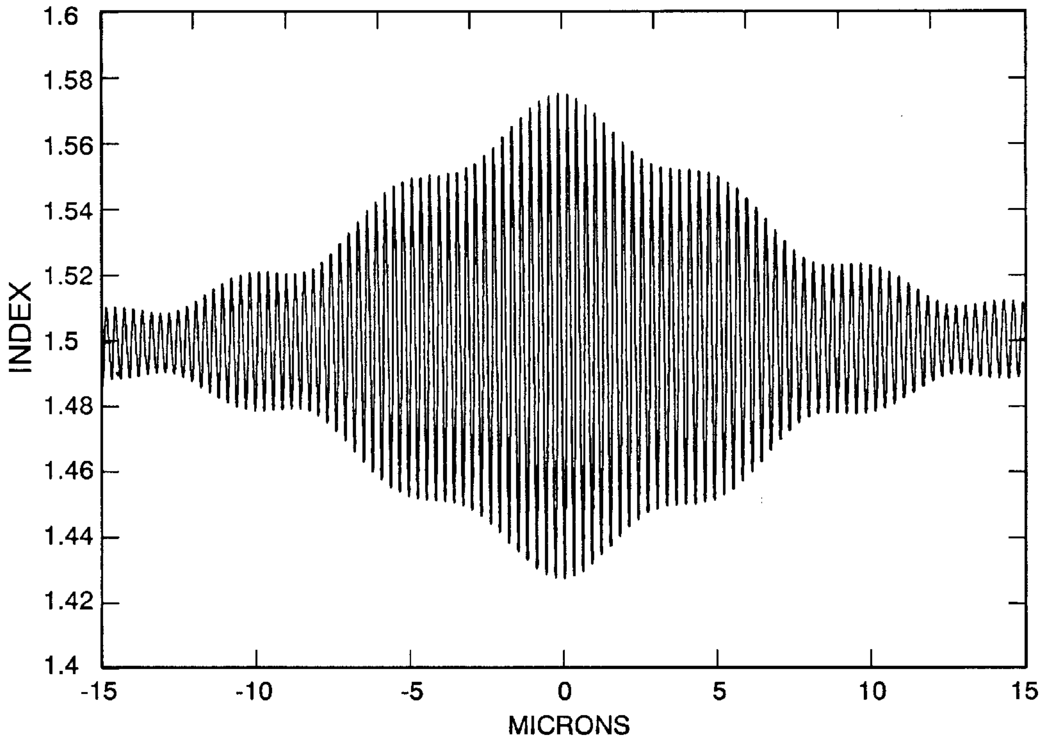
FIG. 3*a*, considered in conjunction with Example 1, shows the refractive index profile for a 30 μm thick filter for which the phase function is optimized according to the invention.
Figure 3B:
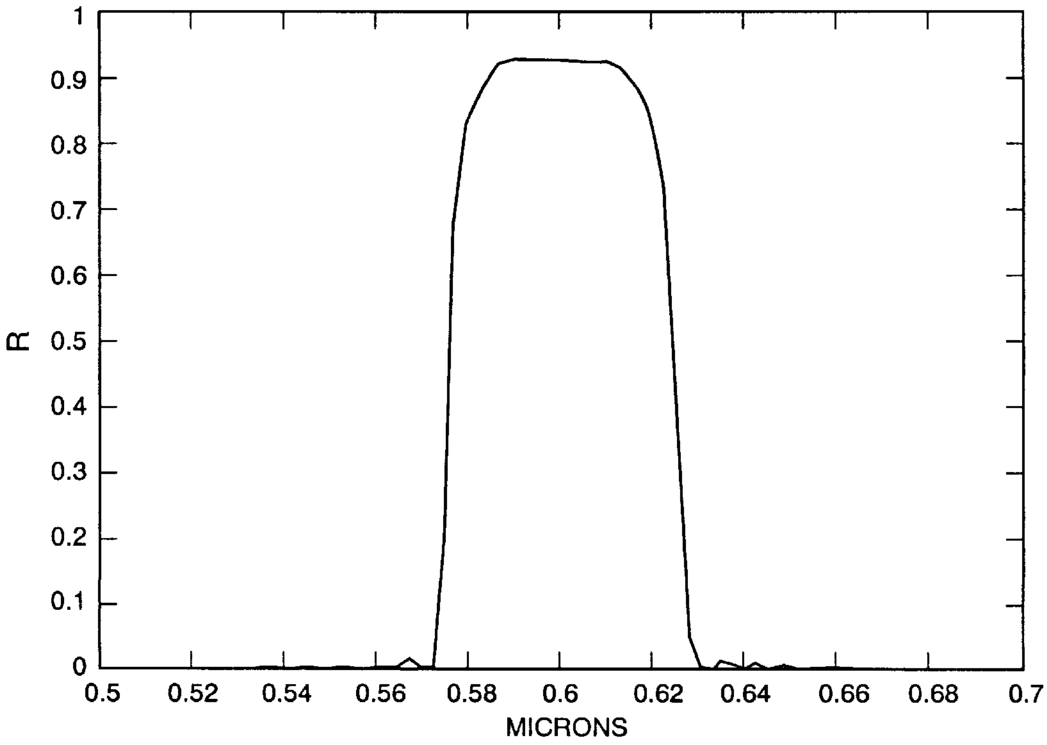
FIG. 3*b* is a plot of reflectivity versus wavelength for the FIG. 3*a* filter.

Recomputing the optimal phase function for a filter 30 μm thick yields refractive index profile shown in FIG. 3*a* and the reflectivity spectrum shown in FIG. 3*b*. It is noted that FIG. 3*a* shows that the index of refraction contrast has been further reduced, and the reflectivity spectrum substantially meets the desired reflectivity wavelength band criteria.

Example 2

Figure 4A:
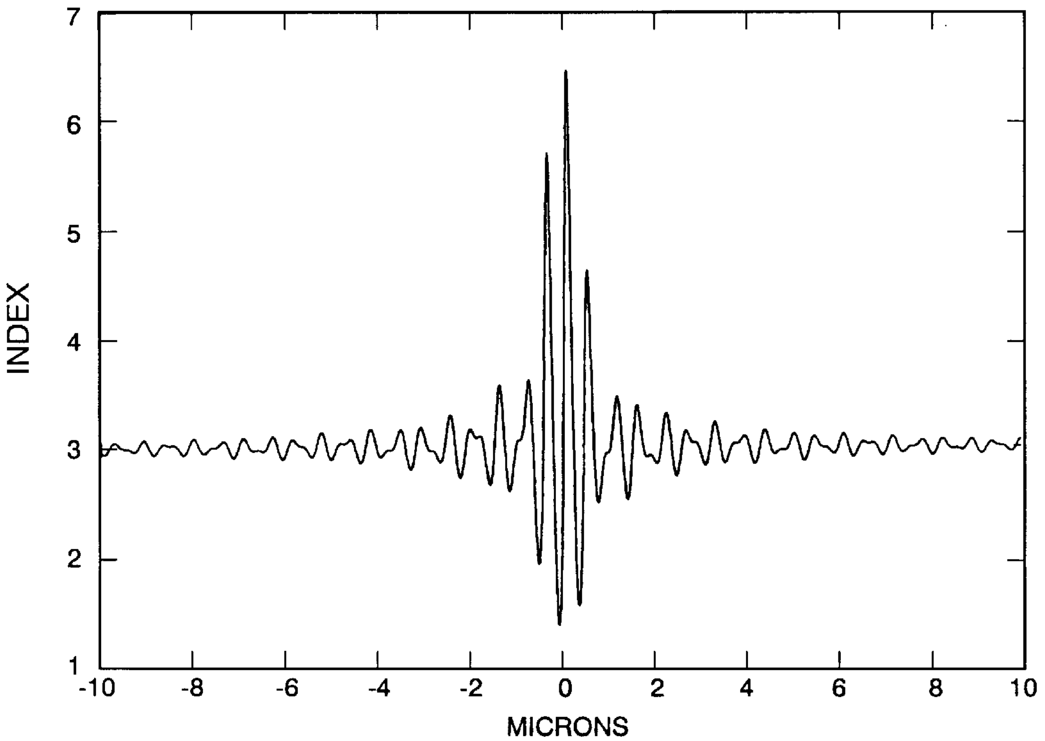
FIG. 4*a*, considered in conjunction with Example 2, shows the refractive index profile in which the phase function is set equal to zero for a high reflectance rugate mirror used with a Ti: sapphire laser.
Figure 4B:
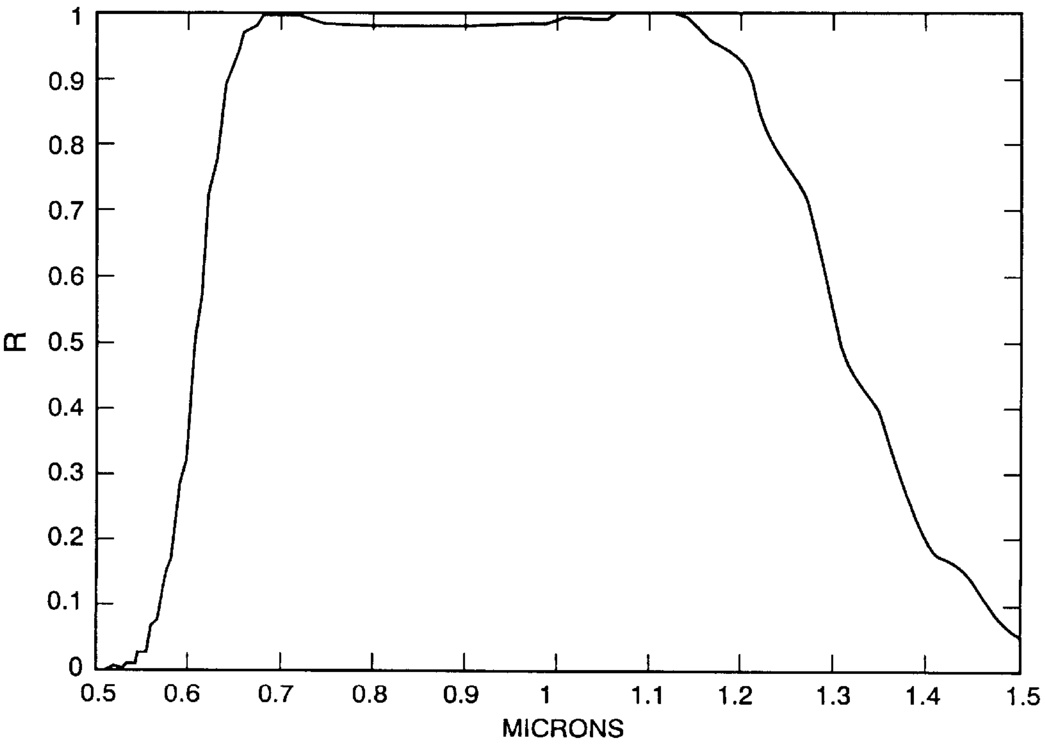
FIG. 4*b* is a plot of reflectivity versus wavelength for the mirror and phase function of FIG. 4*a;*
Figure 5A:
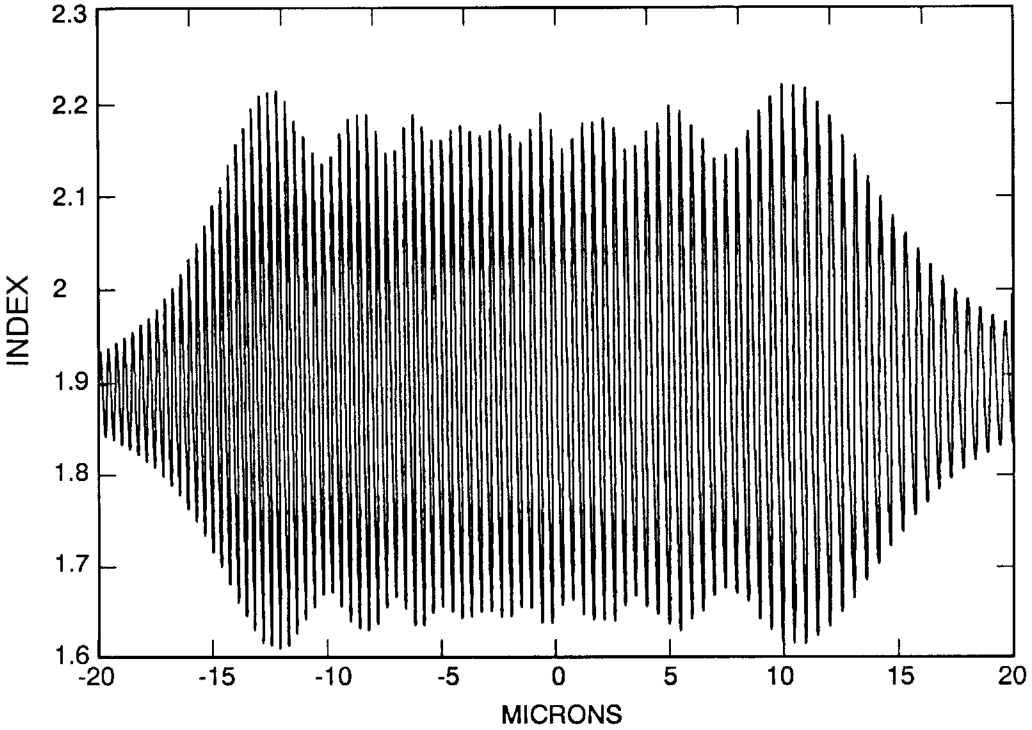
FIG. 5*a*, considered in conjunction with Example 2, is a graph of the refractive index profile for the FIG. 4*a* mirror with an optimized phase function according to the invention.
Figure 5B:
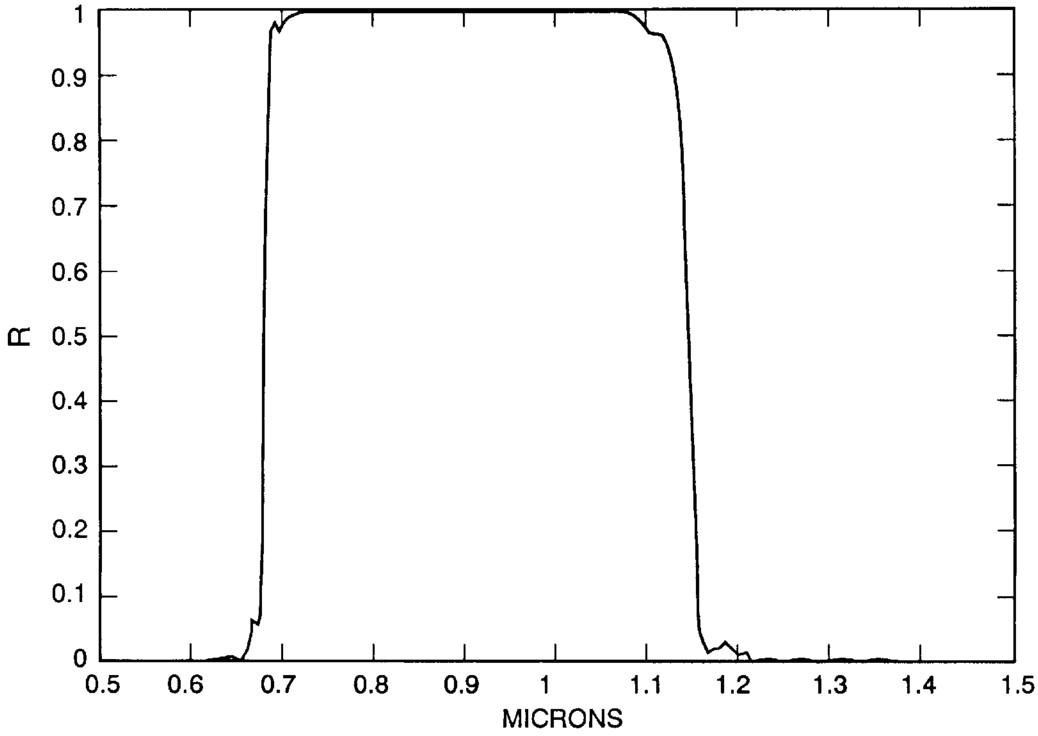
FIG. 5*b* is the reflectivity spectrum for the optimized phase function of FIG. 5*a*.

Consider now in a second example of the method of the invention a requirement for a broadband, high reflectance rugate mirror for use over the wavelength range of operation for a Ti:sapphire laser, and having 99% reflectivity between 700 and 1100 nm and 0% outside this band. Consider n =1.89 at each boundary and a refractive index range of about 1.6 to 2.2. Q(k) is selected as described above for Example 1. FIG. 4*a* shows the refractive index profile in which the phase function is set to zero (Φ(k)=0), and FIG. 4*b* is the reflectivity spectrum for the mirror. The index profile is seen to range from about 1.4 to 6.4, and the reflectance spectrum does not approximate the required criteria, viz, about 98% over the wavelengths to be blocked. The application of phase modulation according to the method of the invention for a 40 μm filter using $CeF_3$:ZnS results in a refractive index profile as shown in FIG. 5*a* and reflectance spectra shown in FIG. 5*b*, wherein the refractive index ranges from about 1.6 to 2.2 and the reflectivity is 99% over the specified wavelengths range (700 to 1100 nm).

The teachings of all references cited herein are incorporated herein by reference.

The Fourier-transform-like coupling between dn(x)/dx and R(λ) according to the method of the invention is helpful for the design and construction of non-linear optical reflectors. Transient changes to the refractive index profile caused, for example, by $\chi^{(3)}$ effects, propagate a perturbation to the reflectance spectrum which may be harnessed for optical computing or optical limiting applications.

The invention therefore provides a method for fabricating a gradient index optical filter with a specified reflectance function and constrained refractive index contrast using a Fourier-based procedure. The freedom to optimize the optical design comes from the physically irrelevant, but mathematically significant, phase function, Φ(k). While specific examples have posed constraints on refractive index contrast, bounds on multilayer thickness, transition gradients, field-of-view, and other facts are possible in principal and are the subjects of work in progress. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A method for fabricating a gradient index optical filter having a specified reflectance function, comprising the steps of:

(a) selecting a transmittance function for an optical filter to be constructed, said transmittance function corresponding to a specified reflectance function for said filter;

(b) providing a source of material and means for vapor depositing said material from said source onto a substrate;

(c) determining the optimal refractive index profile for said optical filter corresponding to the selected transmittance function and said material comprising said source, by applying Fourier transformation to said selected transmittance function; and (d) vapor depositing a layer of said material onto a substrate, said layer having said optimal refractive index profile.

2. The method of claim 1 wherein said source is adapted to contain a material selected from the group consisting of $Al_xGaAs_{1-x}$, $SiO_2$, $CeF_3$, and ZnS.

3. The method of claim 2 wherein said layer of material has a refractive index in a range of about 1 to about 4.

4. The method of claim 1 wherein said substrate comprises a material selected from the group consisting of Si, $SiO_2$, GaAs, sapphire, and $CaF_2$.

* * * * *